H. ROETTGER.
Achromatic Object Glass for Photographic Cameras, &c.

No. 47,336. Patented April 18, 1865.

UNITED STATES PATENT OFFICE.

HERMAN ROETTGER, OF PHILADELPHIA, PENNSYLVANIA.

ACHROMATIC OBJECT-GLASS FOR PHOTOGRAPHIC-CAMERAS, &C.

Specification forming part of Letters Patent No. 47,336, dated April 18, 1865.

*To all whom it may concern:*

Be it known that I, HERMAN ROETTGER, of Philadelphia, in the county of Philadelphia, in the State of Pennsylvania, have invented a new and Improved Achromatic Object-Glass; and I do hereby declare that the following is a full and exact description thereof, reference being had to the accompanying drawings, and to the letters of reference marked thereon, in which—

Figure 1:
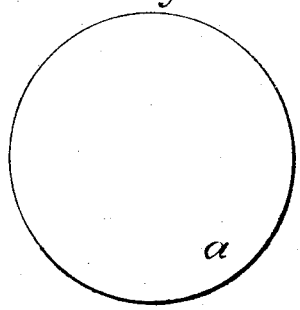
Figure 2:
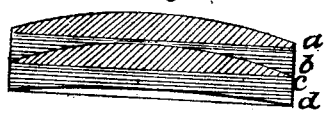

Figure 1 is a plan view, and Fig. 2 is a vertical section of my lens.

Figure 3:
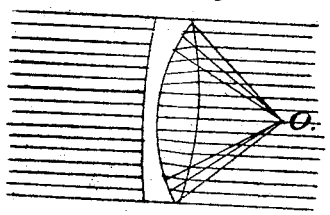

My invention consists in an object-glass composed of four (4) lenses, viz: A and C, crown-glass; B and D, flint glass, cemented, the curves of which, depending mainly upon the focal length required and upon the refractive and dispersive qualities of the glass employed, are so constructed that the usual reflections in the ordinary object-glasses are disposed of and avoided, as will be noticed by reference to the drawings, which show all concave surfaces turned toward the focal image, whereas in the ordinary achromatic lens the interior concave curve between the crown and flint glasses is turned toward the light, and causing by its marginal parts the reflection of rays converging outside in front of the lens, and producing by interference with the parallel rays falling upon the lens an indistinctness of the focal image about its central part, more or less observed, according to the illumination and extent of the object, as may be explained further by referring to Fig. 3 of the drawings, in which the reflection of the marginal rays are seen to converge to a focus at O.

The superiority of my object glass over those now in use consists in obtaining a more perfect correction of spherical and chromatic aberration, in consequence of which the aperture of the object-glass may be considerably enlarged and the volume of light proportionately increased.

What I claim as my invention, and desire to secure by Letters Patent, is—

The construction of an achromatic object-glass composed of four lenses, two of crown-glass and two of flint glass, cemented, to compose one object glass for telescopes, as well as for other purposes, in the manner shown and described.

HERMAN ROETTGER.

Witnesses:
HOWELL EVANS,
THOMAS S. VAN OSTEN.